United States Patent [19]

Roos et al.

[11] 4,009,289
[45] Feb. 22, 1977

[54] METHOD FOR PREVENTING THE FORMATION OF TURBIDITY AND/OR DEPOSITS IN NON-ALCOHOLIC BEVERAGES CONTAINING SUCROSE AND CONCENTRATES FOR SUCH BEVERAGES

[75] Inventors: Robert Roos, Amsterdam; Peter J. Kühn, Bussum, both of Netherlands

[73] Assignee: Naarden International, N.V., Naarden, Netherlands

[22] Filed: Feb. 9, 1976

[21] Appl. No.: 656,721

Related U.S. Application Data

[63] Continuation of Ser. No. 441,343, Feb. 11, 1974, abandoned.

[30] Foreign Application Priority Data

Feb. 12, 1973  Netherlands .................... 7301958

[52] U.S. Cl. .............................. 426/330.3; 426/590
[51] Int. Cl.² .......................................... A23L 2/00
[58] Field of Search .......... 426/190, 213, 217, 191, 426/227, 365, 369, 378, 380, 372, 590, 591, 66, 658, 330.3

[56] References Cited

UNITED STATES PATENTS 3,241,977  3/1966  Mitchell et al. ................... 426/191
3,558,552  4/1972  Carlson et al. ................ 426/190 X
3,667,962  6/1972  Fitzburg et al. ................... 426/191
3,773,961  11/1973  Gordon .......................... 426/190 X

FOREIGN PATENTS OR APPLICATIONS 2,075,351  9/1971  France

OTHER PUBLICATIONS

Furia; Handbook of Food Additives; Publisher: Chem. Rubber Co.; pp. 318, 330.
Whistler; "Industrial Gums", 1959 Academic Press; pp. 237, 271, 238, 239.

Primary Examiner—S. Leon Bashore
Assistant Examiner—Kenneth M. Schor
Attorney, Agent, or Firm—Stevens, Davis, Miller & Mosher

[57] ABSTRACT

A sucrose beverage or beverage concentrate and their method of preparation in which at most 0.25% by weight of gum arabic, calculated as a dry substance on the sucrose as dry substance, is incorporated therein. The gum arabic may be introduced into the beverage or beverage concentrate before, during or after their preparation as a solid or in the form of a 50 to 60% aqueous solution.

13 Claims, No Drawings

METHOD FOR PREVENTING THE FORMATION OF TURBIDITY AND/OR DEPOSITS IN NON-ALCOHOLIC BEVERAGES CONTAINING SUCROSE AND CONCENTRATES FOR SUCH BEVERAGES

This is a continuation of application Ser. No. 441,343, filed Feb. 11, 1974 and now abandoned.

This invention relates to a method for preventing the formation of turbidity and/or deposits in non-alcoholic beverages, and also to beverages and concentrates to be obtained according to said method. In addition the present invention relates to a method for preparing solid and liquid sucrose preparations suitable for application with the method according to the present invention and also to sucrose preparations to be produced according to said method.

It is a well known fact that in lemonades and syrups a deposit may occur shortly after preparation or during storage, said deposit being mostly in the form of very light floccules floating in the liquid. In products which on account of their composition, for example on account of a content of fruit juice, present a cloudy appearance said deposits are not noticed. In clear products, however, the floating floccules are very noticeable and they give rise to complaints about the quality.

In this specification lemonade means a carbonated beverage or a beverage free of carbonic acid, ready for consumption and irrespective of the kind of taste. Syrup means a concentrate from which a lemonade is obtained by dilution with water which may also contain carbonic acid.

In the literature the occurrence of the afore-mentioned deposits is attributed to impurities of the sugar (sucrose) used in preparing the products, namely the presence of saponines (E. Dachs, Brauwelt 109 (1969), 296; K. Molitoris, Brauwelt 112 (1972), 163; Kirk-Othmer, Encyclopedia of Chemical Technology, 2nd edition (1969) Vol. 19, p. 213). Dependent on the nature and the intensity of the purifying process applied when preparing the sucrose the saponine content varies. Even with a content of only a few parts per million deposits are noticed in lemonades and syrups prepared with sugar.

However, it is very well possible that also impurities of a high-molecular nature play a part in the formation of deposits in clear beverages. The same holds for components of flavors used in preparing lemonades and syrups, said flavors often being of vegetable origin. Light has an accelerating influence on the formation of the deposits.

The tendency of sucrose solutions to form deposits can be determined with the "Spreckels Qualitative Floc Test" which is described in Standard and Test procedures for "Bottlers" Granulated and Liquid Sugar, page 7, published by American Bottlers of Carbonated Beverages, Washington 6, D.C.

Well known lemonades in which said deposits may occur are lemon-drink, lemon-lime drink, bitter lemon, dandelion/burdock lemonade and cola lemonade. These lemonades are mostly prepared on an industrial scale from concentrates or syrups in which the deposit may already be present. The deposit can also be formed at or a considerable time after the addition of the acid mostly used for preparing the lemonades either to the syrup or to the lemonade.

In addition syrups are known which by a simple dilution with water produce a lemonade ready for consumption. These syrups, which are mostly used for household purposes, may also show deposits, the more so since these products are often kept longer than industrially used syrups. Tastes of frequent occurrence of these syrups are: citron, citromint, campari, peppermint, anise (pastis), grenadine.

It has been found that the formation of turbidity and deposits in lemonades and in concentrates for their production is prevented by causing the beverages and concentrates to contain a small quantity of gum arabic. The amount of gum arabic (also called acacia gum) which should be used according to the present invention is so small that it does not have any noticeable influence on the physical properties, for example the viscosity, and the organoleptical properties of the lemonade and syrups.

There are syrups and lemonades known in which, for economic reasons or in order to lower the nutritional value, the sucrose is replaced to a considerable degree or completely by other sweeteners, such as saccharin or cyclamate. Quite apart from the quality of taste such beverages create in the mouth a sensation which in comparison with the beverage normally prepared with sucrose is designated as "empty." This sensation can be partly eliminated by the addition of substances raising the viscosity. For this purpose gum arabic may serve, although in comparison with other similar substances gum arabic is less suitable on account of the rather large quantities which must be used to obtain a noticeable increase of the viscosity and thus a "fuller" taste. Naturally as a result of replacing the sucrose for the greater part or even completely the possibility of the occurrence of deposits in such lemonades and syrups is considerably smaller or even does not exist.

The active quantities of gum arabic for the prevention of deposits vary according to the content of sucrose of the lemonades or syrups and the amount of impurities present in the sucrose. Quantities of up to 0.25% by weight of gum arabic, calculated on the weight of the sucrose present, may be necessary. In general, however, an amount of gum arabic of approximately 0.1% by weight, calculated on the weight of the sucrose, is found to be sufficient.

If the gum arabic is added during the preparation of the syrup, the formation of a deposit, both in the syrup and in the lemonade prepared therefrom, is prevented. In so doing it is immaterial whether one has included already the acid usually applied in the preparation of such beverages, as for instance citric acid, tartaric acid, fumaric acid, malic acid or phosphoric acid, whether it be as a component in the syrup or whether one combines the acid with the syrup only shortly before the preparation of the lemonade.

In an acidic environment gum arabic is negatively charged. Other colloids also negatively charged in an acidic environment, such as carraghene, pectin and carboxymethyl cellulose and other vegetable gums, are found unable to prevent the formation of deposits in lemonades and syrups.

Lemonades and syrups are prepared by dissolving the components in water. In order to perform the method according to the present invention for preventing the formation of turbidity and deposits in the lemonades and syrups one may add the gum arabic to the water at any time, that is to say before, during or after dissolving the components in the water. It is therefore also possible to add the gum arabic to the ready lemonade or syrup which naturally should be done before the occurrence of turbidity or the formation of a deposit.

The gum arabic can be added in powdered form, but very suitably also as an aqueous solution. An aqueous solution having a concentration of 50-60% by weight is very useful.

One also may add the gum arabic to one of the components of the lemonade or the syrup before their preparation. Since sucrose constitutes the most important component as regards the quantity by weight, said substance is in particular considered for being mixed with the gum arabic. Thus one may mix dry crystallized sucrose with the required amount of gum arabic in powdered form and in this way prepare a dry preparation suitable to be used in preparing lemonades and syrups. In industrial practice when preparing lemonades and syrups, however, the sucrose is mostly used in the form of a concentrated syrup of 67° Brix which means a solution of 67% by weight. The so-called "bottlers liquid sugar" may very suitably be mixed with a concentrated solution of gum arabic or for example 50-60% by weight in water so that a liquid sucrose preparation is produced which is very suitable to be used in the preparation of lemonades and syrups which remain clear. Solid and liquid sucrose preparations should contain at most 0.25% by weight and as a rule about 0.1% by weight of gum arabic, calculated as a dry substance on the weight of the sucrose as a dry substance. They may be prepared very suitably by the manufacturer of the sucrose.

The present invention will be further illustrated in the following non-limiting examples:

EXAMPLE I

From two qualities of sucrose, designated by the manufacturer as "normal" and "extra refined," 67° Brix solutions were prepared with the aid of tap water. The solutions were filtered over a G3 glass filter and put in small bottles of colorless glass having a capacity of 300 ml. The small bottles were stored in closed condition at room temperature such that daylight could enter. After 14 days the normal quality showed a deposit in the form of floccules. The extra refined quality was still clear after 30 and after 65 days.

A solution of the normal quality to which during the preparation 0.15% by weight of gum arabic, calculated on the sucrose, had been added was also still clear after 30 and after 65 days.

EXAMPLE II

During the industrial preparation of sucrose from sugar beets by decolorizing, clarifying and boiling down of the juice to a syrup of 67° Brix there was added to this syrup a quantity of a 50% by weight aqueous solution of gum arabic such that the syrup contained 0.125% by weight of gum arabic, calculated as dry matter on the sucrose calculated as dry matter. The syrup thus obtained was still clear after 2 months and could be used for lemonades and syrups that remain clear.

EXAMPLE III

Syrups were prepared which had the composition as shown in Table A.

TABLE A

| Components | A | B |
|---|---|---|
| Sucrose (x) | 640 g | 640 g |
| Cochenille (E 124) 5% aqueous solution | 6.2 ml | 6.2 ml |
| Edicol blue (E 132) 1% aqueous solution | 0.3 ml | 0.3 ml |
| Tartaric acid, 50% aqueous solution | 5.0 ml | 5.0 ml |
| Potassium sorbate 30% aqueous solution | 0.8 ml | 0.8 ml |
| Grenadine flavor AE 15221 (sold by Naarden International) | 4.0 ml | 4.0 ml |
| Gum arabic 50% aqueous solution | — | 1.92 ml |
| Water up to | 1000 g | 1000 g |

(x) The sucrose was used in the form of a syrup of 67° Brix in a quantity containing 640 g of dry saccharose.

Samples of the syrup were kept in closed bottles of colorless glass at room temperature and with free access of daylight. After 18 days sample A showed formation of floccules. After 37 days and even after 65 days sample B was still entirely clear.

Immediately after the preparation of both syrups lemonades were made from these syrups by dissolving 1 part by volume of syrup in 5 parts by volume of water. The lemonades were pasteurized for half an hour in closed bottles at 85° C. After having been stored for 12 days at room temperature the lemonade of syrup A showed floccules. The lemonade of syrup B was still clear after having been stored for 65 days at room temperature.

EXAMPLE IV

Three types of syrup were prepared having the composition as shown in Table B.

Table B

| Components | Tonic A | Tonic B | Type Campari A | Type Campari B | Up A | Up B |
|---|---|---|---|---|---|---|
| Sucrose | 500 g | 500 g | 500 g | 500 g | 500 g | 500 g |
| Citric acid, 50% aqueous solution | 20 ml | 20 ml | 15 ml | 15 ml | 10 ml | 10 ml |
| Potassium sorbate, 30% aqueous solution | 0.8 ml | 0.8 ml | 0.8 ml | 0.8 ml | 0.8 ml | 0.8 ml |
| Flavoring essence | 8 ml | 8 ml | 15 ml | 15 ml | 5 ml | 5 ml |
| Cochenille (E 124) 5% aqueous solution | — | — | 7 ml | 7 ml | — | — |
| Edicol blue (E 132) 1% aqueous solution | — | — | 0.5 ml | 0.5 ml | — | — |
| Sodium citrate | — | — | — | — | 2 g | 2 g |
| Gum arabic | — | 0.75 g | — | 0.75 g | — | 0.75 g |
| Water up to | 1000 g | 1000 g | 1000 g | 1000 g | 1000 g | 1000 g |

The behavior of the syrups while being stored at room temperature is shown in Table C.

Table C

| Storage period, days | Tonic A | Tonic B | Campari A | Campari B | Up A | Up B |
|---|---|---|---|---|---|---|
| 4 | flocculous | clear | clear | clear | clear | clear |
| 18 | " | " | flocculous | " | " | " |
| 37 | " | " | " | " | flocculous | " |
| 65 | " | " | " | " | " | " |

Immediately after the preparation of the syrups lemonades were prepared from these syrups by mixing the water in the volume ratios as shown in Table D. The behavior of the syrups while being stored at room temperature is also shown in Table D.

Table D

| Volume ratio syrup:water storage period, days | Tonic 1 : 4 A | Tonic 1 : 4 B | Compari 1 : 5 A | Compari 1 : 5 B | Up 1 : 4 A | Up 1 : 4 B |
|---|---|---|---|---|---|---|
| 4 | clear | clear | flocculous | clear | clear | clear |
| 18 | flocculous | " | " | " | " | " |
| 37 | " | " | " | " | flocculous | " |
| 65 | " | " | " | " | " | " |

What is claimed is:

1. A method for preventing the formation of turbidity and/or deposits in clear non-alcoholic beverages which are free of floccules and other deposits and containing sucrose as the main sweeting agent and clear liquid concentrates for these beverages, consisting essentially of adding thereto at most 0.25% by weight of gum arabic, calculated as dry substance on the weight of the sucrose and at least an amount of gum arabic sufficient to prevent the formation of turbidity and/or deposits in said beverage.

2. The method according to claim 1, wherein prior to preparing the beverage or the concentrate solid gum arabic is added thereto.

3. The method according to claim 1, wherein prior to preparing the beverage or the concentrate an aqueous solution of gum arabic is added thereto.

4. The method according to claim 2, wherein the gum arabic is added to sucrose or sucrose syrup.

5. The method according to claim 3, wherein the gum arabic is added to sucrose or sucrose syrup.

6. The method according to claim 1, wherein solid gum arabic is added thereto during the preparation of the beverage or the concentrate.

7. The method according to claim 1, wherein an aqueous solution of gum arabic is added thereto during the preparation of the beverage or the concentrate.

8. The method according to claim 1, wherein solid gum arabic is added thereto after the preparation of the beverage or the concentrate.

9. The method according to claim 1, wherein an aqueous solution of gum arabic is added thereto after the preparation of the beverage or the concentrate.

10. The method according to claim 1, wherein approximately 0.1% by weight of gum arabic, calculated as dry substance on the sucrose is employed.

11. The method according to clam 1, wherein the gum arabic is in the form of a 50 to 60% aqueous solution.

12. A clear non-alcoholic beverage which is free of floccules and other deposits and containing sucrose as the main sweetening agent or a clear liquid concentrate for such a beverage, consisting essentially of at most 0.25% by weight of gum arabic, calculated as a dry substance on the weight of the sucrose present and at least an amount of gum arabic sufficient to prevent the formation of turbidity and/or deposits in said beverage.

13. The beverage or concentrate according to claim 12, wherein the beverage or concentrate contains about 0.1% by weight of gum arabic, calculated as a dry substance on the sucrose present.

* * * * *